(12) United States Patent
Kao (10) Patent No.: US 8,557,072 B2
(45) Date of Patent: Oct. 15, 2013

(54) METHOD FOR MAKING SQUARE RUGS FROM RECYCLED MATERIALS

(75) Inventor: Semi Kao, Huatan Township, Changhua County (TW)

(73) Assignee: Shiun Jiug Industrial Co., Ltd., Changhua County (TW)

( * ) Notice: Subject to any disclaimer, the term of this patent is extended or adjusted under 35 U.S.C. 154(b) by 121 days.

(21) Appl. No.: 13/182,745

(22) Filed: Jul. 14, 2011

(65) Prior Publication Data

US 2013/0014884 A1    Jan. 17, 2013

(51) Int. Cl.
     *B29C 65/54*      (2006.01)
     *B29C 44/08*      (2006.01)

(52) U.S. Cl.
     USPC .............................. 156/79; 156/72; 156/308.2

(58) Field of Classification Search
     USPC .................. 156/72, 79, 308.2; 428/91, 95, 96
     See application file for complete search history.

(56) References Cited

U.S. PATENT DOCUMENTS

| | | | | |
|---|---|---|---|---|
| 4,656,074 A * | 4/1987 | Conley et al. | ................... | 428/95 |
| 6,316,075 B1 * | 11/2001 | Desai et al. | ..................... | 428/87 |
| 6,860,953 B1 * | 3/2005 | Grizzle et al. | .................. | 156/72 |
| 7,622,408 B2 * | 11/2009 | Zafiroglu | ....................... | 442/402 |
| 2012/0288663 A1 * | 11/2012 | Sabry | ............................... | 428/95 |

* cited by examiner

*Primary Examiner* — Michael Tolin
(74) *Attorney, Agent, or Firm* — Ming Chow; Sinorica, LLC (57) ABSTRACT

The present invention relates to provide a method for making square rugs from recycled materials. Firstly, make one piece of surface material: Melt the woven layer of the surface material at a proper temperature. Then, apply a proper pressure to press the surface material till each fluff of the surface material is firmly secured to the woven layer. After that, make one piece of base material and one piece of middle material made of the resilient foam material reclaimed from abandoned waste. Apply a proper pressure to press the base material, the middle material and the surface material till they are stuck on each other. Heat the stuck surface material, the middle material and the base material. The middle material will foam after heating, and produce a force to stick itself on the surface material and the base material. Thus, a square rug is finished.

9 Claims, 7 Drawing Sheets

METHOD FOR MAKING SQUARE RUGS FROM RECYCLED MATERIALS

BACKGROUND OF THE INVENTION

1. Field of the Invention

The present invention relates to square rugs, and more in particular to provide a method for making square rugs from recycled materials.

2. Description of the Related Art

A well-known rug installed on the ground of office is generally called a square rug, a ceramic tile rug or a combination rug. The process is to glue rugs onto the ground, and piece them together. It is similar to install ceramic tiles onto the ground.

Generally speaking, the conventional square rug is made of one piece of flannelette, one piece of resilient material and one piece of hard material, which are glued together. The flannelette is used to create a comfortable touch feeling. The resilient material is used to create resilience and a soft tread feeling, and absorb shock. The hard material is used to stabilize the rug configuration for the convenience of installation and transportation.

For the well-known square rug, its flannelette, resilient material and hard material are laminated by glue or adhesive. Such kind of process will result in air pollution or water pollution. It is an environmental issue. Moreover, the resilient material and the hard material of the square rug come from rubber, foam sponge or plastic. The rug consumes natural resources (natural rubber, petroleum, etc. . . . ). It is not environment, either. What is more, when the rug is installed onto the ground, glue or adhesive is used to stick the rug on the ground. The process is complicated, and the glue or the adhesive emits an odor which makes the constructors uncomfortable.

SUMMARY OF THE INVENTION

The main purpose of the present invention is to provide a method for making square rugs from recycled materials. This method salvages the recycled materials, avoids the consumption of natural resources, and reduces the production cost. Besides, the rug is very skid proof and stable on configuration. It is unnecessary to glue the ground. The rug installation is easy, and it is very environmental.

In order to achieve above mentioned purpose, the present invention provides a method of making square rugs from recycled materials. Firstly, make one piece of surface material. Melt the woven layer of the surface material at a proper temperature. Secondarily, apply a proper pressure to press the surface material till each fluff of the surface material is firmly secured to the woven layer. Thirdly, prepare one piece of base material and one piece of middle material, made of the resilient foam material reclaimed from abandoned waste. Apply a proper pressure to press the base material, the middle material and the surface material till they are stuck on each other. Then, heat them (the struck surface material, middle material and base material). As the middle material foams after heating, the middle material will create a force to stick itself on the surface material and the base material. Thus, a square rug is completed.

DETAILED DESCRIPTION OF THE INVENTION

Here is a preferred embodiment together with drawings for a further description.

Figure 1:
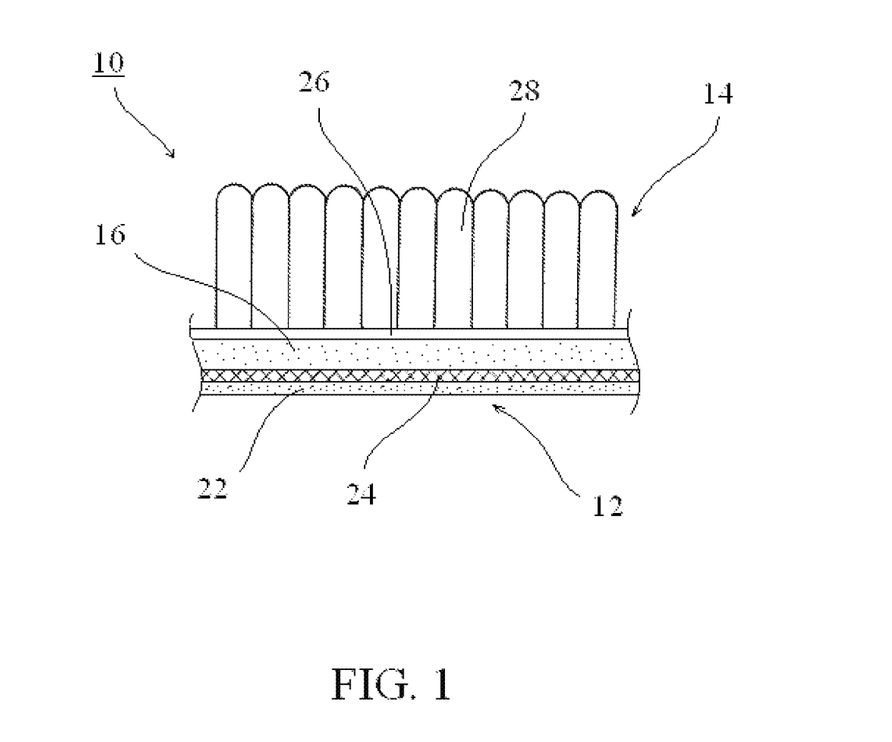
FIG. 1 is a part enlarges chart of a first preferred embodiment of the present invention.

Firstly, referring to FIG. 1 of the present invention, this is a preferred embodiment showing a square rug 10 made of reclaimed abandoned waste. The rug includes one piece of base material 12, one piece of surface material 14 and one piece of middle material 16.

The base material 12 is made of one piece of skid proof material 22 struck to one piece of reinforced material 24. The skid proof material 22 is made of resilient foam material containing rubber and plastic constitutes, which are reclaimed from abandoned waste. Such abandoned waste must be minced first. The abandoned waste containing high percentage of plastic constituent is selected to mix with foaming agent as a resilient foam material mentioned above. The reinforced material 24 is a material of high hardness (hardness value above 60), such as non-woven cloth.

The surface material 14 is a flannelette-woven semi-finished product, which contains one woven layer 26 and a plurality of fluff 28 protruding above the woven layer 26. The fluff 28 is firmly secured to the heat-melted woven layer 26. (The heat-melted woven layer can be stuck on one piece of reinforced material made of non-woven cloth.)

The middle material 16 is stuck between the base material 12 and the surface material 14. The middle material is made of resilient foam material reclaimed from abandoned waste which contains rubber and plastic constitutes. Such abandoned waste must be minced first. The abandoned waste containing a high percentage of plastic constituent is selected to mix with foaming agent as a resilient foam material mentioned above. The middle material has a soft character. Its hardness is 20°-50°.

The square rug 10 of the present invention is made of the material reclaimed from abandoned waste. Its characters and the advantages are shown below —

Except the surface material 14, the constituents of the square rug 10 contain a large amount of materials reclaimed from abandoned waste. Just a few amount of rubber or plastic is used as a material.

If compared with conventional square rug, the present rug reduces production cost, makes use of trashed materials, and reduces trash.

Furthermore, the skid proof material 22 of the base material is very skid proof. Therefore, it is unnecessary to use glue to install the present rugs on the ground of the office and the residential house while the conventional rugs need glue. When the present square rug 10 is placed on the ground, it won't move. It saves glue cost, and has no pollution caused by glue.

What is more, the reinforced material 24 is rigid, so the configuration of the square rug 10 is much stable. Thus, it is firm to stick on the ground, and the installation is easy.

Figure 2:
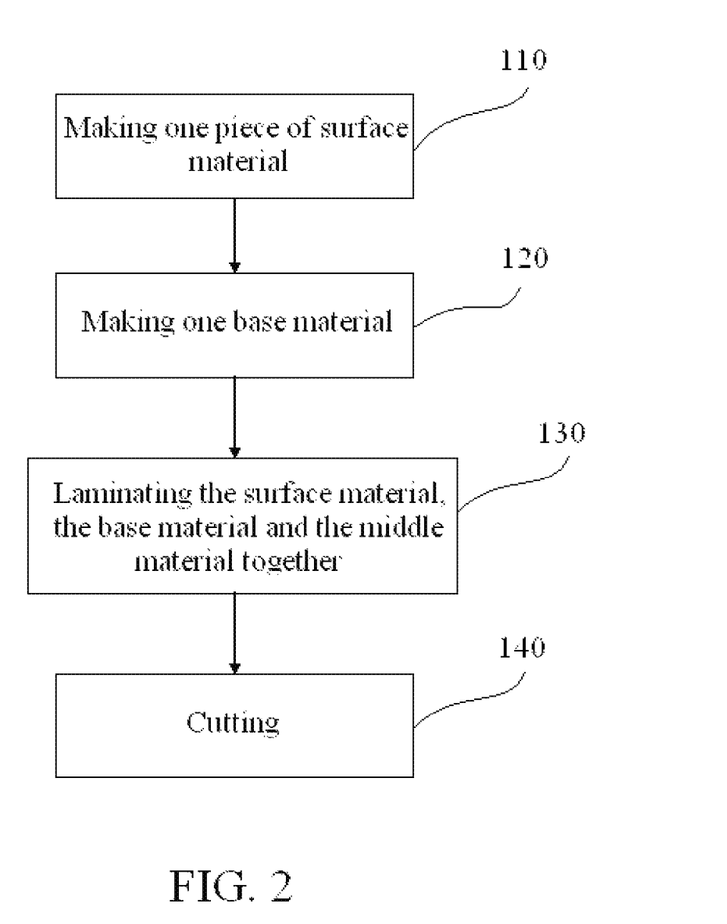
FIG. 2 is a flowchart of a first preferred embodiment of the present invention.

Further referring to FIG. 2, the manufacture method of the square rug 10 is shown below —

Figure 3:
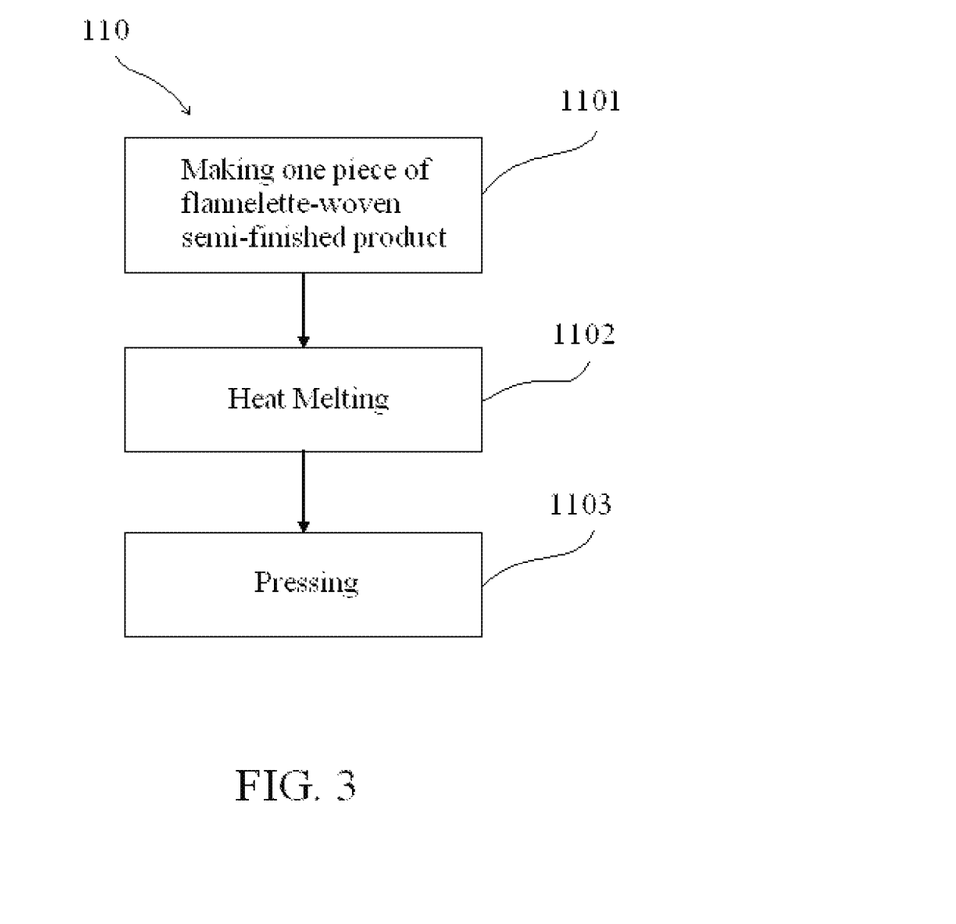
FIGS. 3, 4, 5 and 6 are part flowchart of a first preferred embodiment of the present invention.

The first step 110 is to make one piece of surface material 14. FIG. 3 illustrates its manufacture method as shown below a) Making one piece of flannelette-woven semi-finished product 1101, which comprises one woven layer 26 and a plurality of fluff 28 protruding above the woven layer 26.

b) Heat melting 1102: use an ordinary heat-melting device at a proper temperature to melt the woven layer 26. (The temperature must be over the melting temperature of the flannelette-woven semi-finished product.)

c) Pressing 1103: use an ordinary press device with two rollers to press the flannelette-woven semi-finished product 1101. (The press device can press one piece of reinforced material and one heat-melted flannelette-woven semi-finished product at the same time till they are stuck on each other. The reinforced material is one piece of non-woven cloth.) After the heat-melted woven layer 26 congeals, each fluff 28 can be firmly secured to the woven layer 26.

Figure 4:
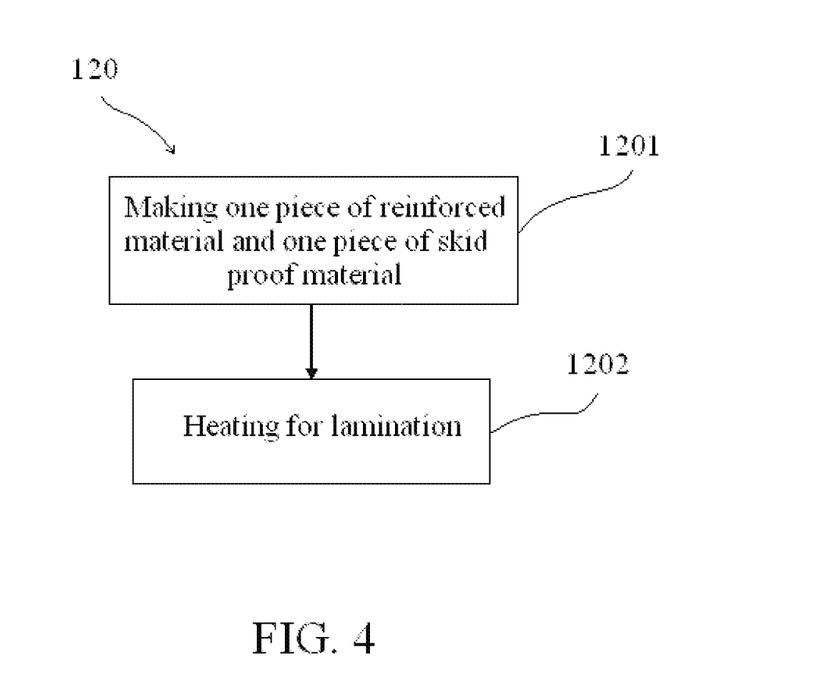
Figure 5:
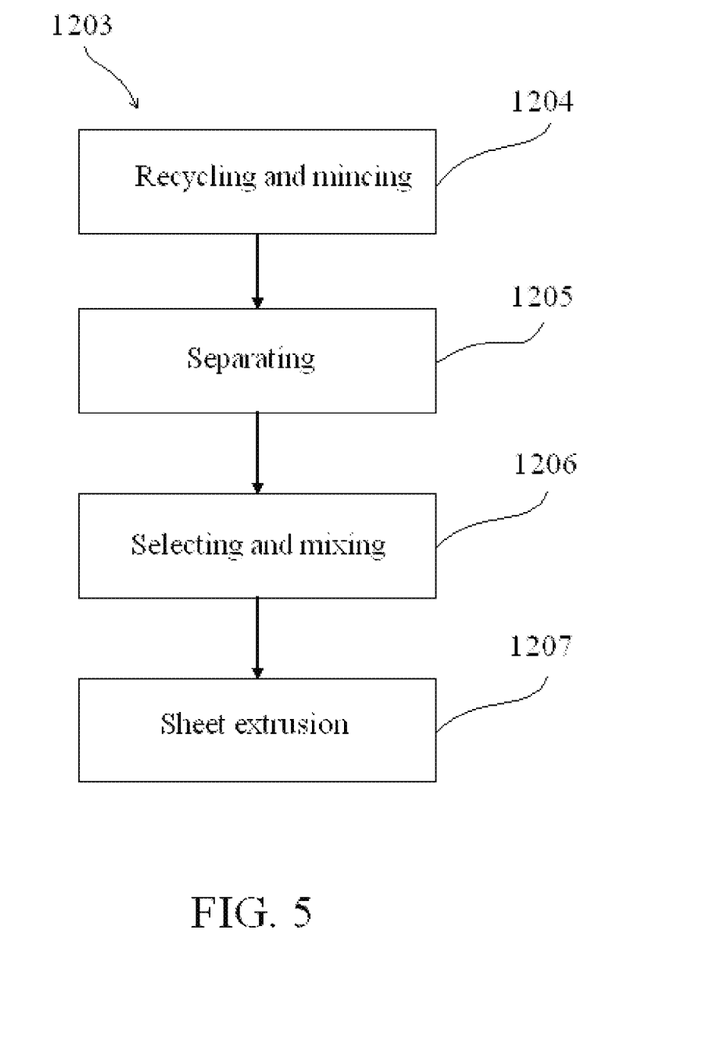

The second step 120 is making one piece of base material. FIG. 4 illustrates its method as shown below a) Making one piece of reinforced material and one piece of skid proof material 1201: as mentioned above, the reinforced material 24 is one piece of non-woven cloth. The manufacture step 1203 of the skid proof material 22 is as FIG. 5 shown —

Recycling and mincing 1204: reclaim the abandoned waste containing plastic or rubber constitutes. Use an ordinary mincing device to mince the abandoned waste into little bits. After mincing, the different constituents in the little bits cannot be completely separated, but the little bits with different constituents can be added to the foam material as a secondary. For example, the little bits from abandoned waste, containing rubber as its major constituent (with a high percentage of rubber constituent), can be served as a resilient adjustment material for the foam material. The little bits from abandoned waste, containing plastic as its major constituent (with a high percentage of plastic constituent), can be served as a hardness adjustment material for the foam material. The little bits from abandoned waste, containing fibers as its major constituent, can be served as a bridging agent or a reinforcement agent.

Separating 1205: Use one container (not shown in the figure) on an ordinary conveyer belt to hold the little bits of the abandoned waste. By means of the vibration caused by the transportation of the container on the conveyer belt, the little bits with different constituents in the container will be automatically and roughly separated based on their specific weights. In other words, the fiber is lighter than the plastic and the rubber on specific weight. Therefore, most of the fibers accumulate on the top layer of the container.

Selecting and mixing 1206: depending on the actual requirement, select the little bits from minced abandoned waste, containing a higher percentage of plastic constitute, to mix with chemical agent, such as foam agent, bridging agent or thickener. Adequately blend them, and disinfect the mixture.

Sheet extrusion 1207: use an ordinary mixing machine to blend the materials. Then, extrude the mixture into sheet.

b) Heating for lamination 1202: let the reinforced material 24 be exactly laminated to the skid proof material 22. Heat them by an oven. The skid proof material 22 will foam after heating, and create a force to stick itself on the reinforced material 24. Thus, a base material 12 is formed.

Figure 6:
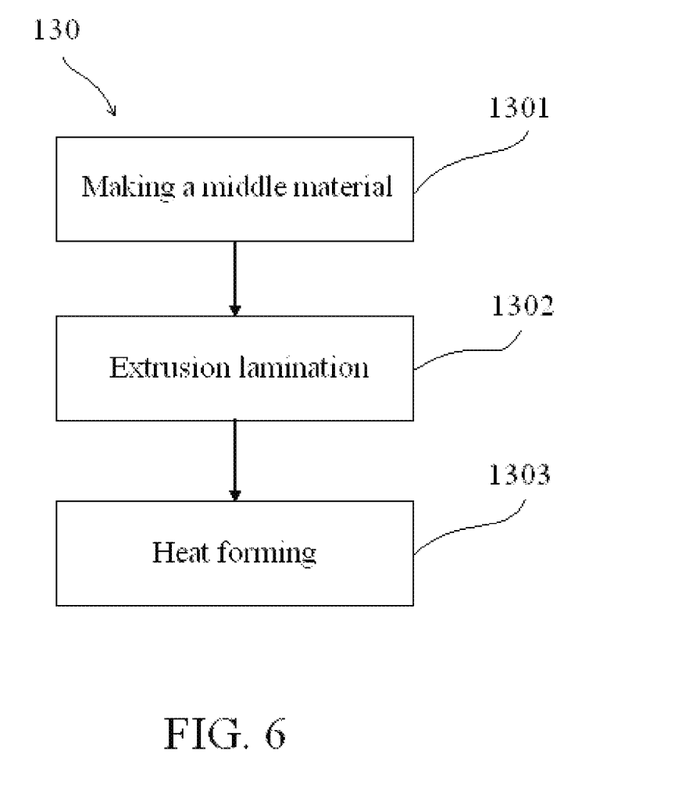

The third step 130 is to laminate the surface material, the base material and the middle material as FIG. 6 shown. Its method is:

a) Making a middle material 1301: the manufacture method of the middle material 16 is the same as it of skid proof material 22. The process also contains reclamation, mincing, layer separation, material selection, blending and sheet extrusion. Select the little bits of minced abandoned waste, which contain a higher percentage of rubber constituent. Mix the selected little bits with a chemical agent, such as foam agent, bridging agent or thickener so as to form a sheet material.

b) Extrusion lamination 1302: place the middle material 16 between the surface material 14 and the base material 12. Use an ordinary laminating device to laminate them.

c) Heat forming 1303: heat the laminated surface material 14, the middle material 16 and the base material 12 by an ordinary oven. The middle material 16 will foam after heating, and create a force to stick itself on the surface material 14 and the base material 12. Thus, a rug is finished.

The fourth step 140 is cutting: cut the formed rug into a square shape. Thus, a square rug 10 is finished.

Figure 7:
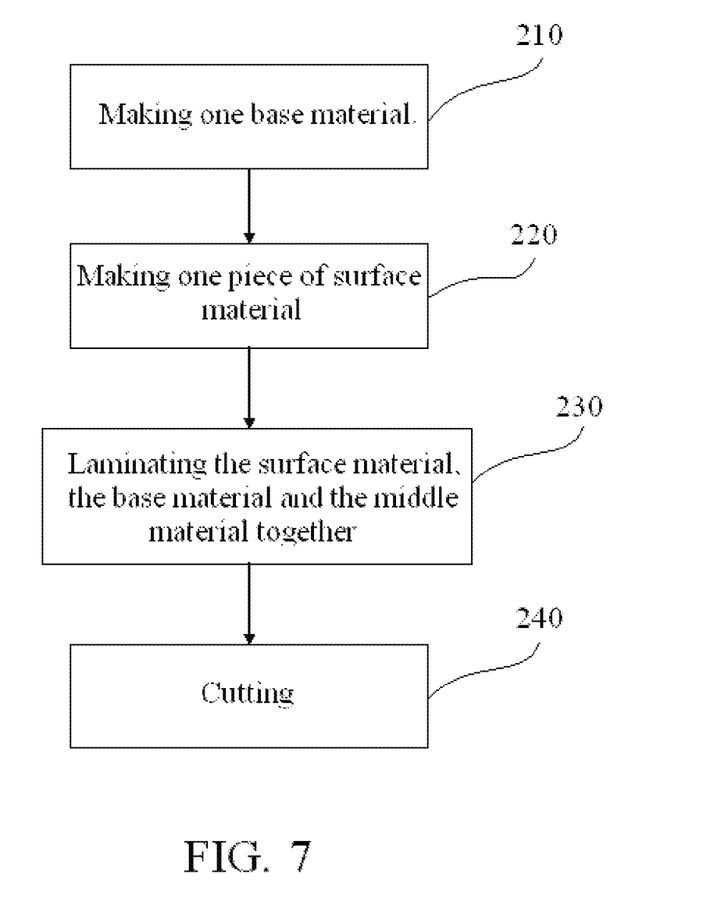
FIG. 7 is a flowchart of a second preferred embodiment of the present invention.

Besides, referring to FIG. 7, the square rug 10 can also be made according to the following steps: making a base material 210 and a surface material 220. Laminate the surface material, the base material and the middle material 230. Then, cut them 240. In this way, a square rug with the same structure and the same function as mentioned above can be made.

As mentioned above, except the surface material, a large amount of reclaimed abandoned waste is used as the materials for the rug of the present invention. Only less amount of rubber or plastic material is needed. It reduces production cost if compared with the conventional square rug. It also makes use of discarded materials, and reduces trash amount. Besides, the square rug is very skid proof, stable on configuration and sticky on the ground. The rug can be directly placed on the ground, and won't move, while the conventional square rug needs glue to stick itself on the ground. The present square rug saves the glue cost, and avoids glue pollution during installation. Besides, the installation is very easy.

What is claimed is:

1. A method for making square rugs from recycled materials, comprising the steps of:

a) making one piece of surface material by performing the steps of:

preparing one flannelette-woven semi-finished product which includes one woven layer and a plurality of fluff protruding above the woven layer;

applying heat to melt the woven layer at a proper temperature; and applying a proper pressure to press the flannelette-woven semi-finished product until each fluff is firmly secured to the woven layer;

b) making one base material by performing the steps of:

preparing one reinforcing material and one skid proof precursor material, wherein the reinforcing material is a piece of rigid cloth, and the skid proof precursor material is a sheet material made of material reclaimed from abandoned waste mixed with foaming agent; and placing the reinforcing material on the skid proof precursor material and heating them to cause the skid proof precursor material to foam and adhere to the reinforcing material, thereby forming a base material comprising the reinforcing material adhered to a resilient foam skid proof material, and c) laminating the surface material, the base material and a middle material together by performing the steps of:

making one piece of middle precursor material by mixing material reclaimed from abandoned waste with foaming agent;

extruding the middle precursor material between the surface material and the base material, and applying a proper pressure to laminate them together; and heating the laminated surface material, middle precursor material and the base material to cause the middle material to foam and adhere to the surface material and the base material, thereby forming a square rug comprising the surface material adhered to the base material by a resilient foam middle material.

2. The method as defined in claim 1, wherein the step a) comprises melting the woven layer with a heating device.

3. The method as defined in claim 1, wherein the step a) comprises extruding the flannelette-woven semi-finished product with an extruding device.

4. The method as defined in claim 1, wherein the skid proof material and the middle material are manufactured by the steps of:

reclaiming abandoned waste containing rubber and plastic constituents and mincing the abandoned waste into little bits;

separating the abandoned waste little bits into different layers automatically by their different specific weights;

selecting abandoned waste little bits containing a specific percentage of rubber or plastic constituent depending on actual need and blending the selected abandoned waste little bits with foaming agent; and applying a proper pressure to extrude the mixture into a sheet.

5. The method as defined in claim 4, wherein the process of separating little bits comprises the use of vibration to automatically separate the little bits of the minced abandoned waste into the different layers based on different specific weights of the constituents of the minced abandoned waste.

6. The method as defined in claim 4, wherein the skid proof precursor material and the middle precursor material are made of a mixture comprising abandoned waste little bits containing rubber and plastic constituents, additional rubber and plastic, and foaming agent.

7. The method as defined in claim 6, wherein:

in the skid proof material, the weight ratio of the abandoned waste little bits to the additional rubber and plastic is from 1:9 to 1:4, and in the middle material, the weight ratio of the abandoned waste little bits to the additional rubber and plastic is from 1:1 to 1:9.

8. The method as defined in claim 1, wherein the steps of heating the skid proof precursor material and heating the middle precursor material to cause them to foam are performed by heating in an oven.

9. The method as defined in claim 1, wherein, the square rugs comprise the base material adhered to the surface material by the middle material, the base material is a rigid material and includes one skid proof material made of resilient foam material of reclaimed abandoned waste and the reinforcing material adhered to a surface of the skid proof material;

the surface material includes one woven layer and a plurality of fluff protruding above the woven layer, each fluff being firmly secured to the woven layer, and the middle material is made of resilient foam material reclaimed from abandoned waste and has a proper flexibility.

\* \* \* \* \*